(12) United States Patent
Levy et al.

(10) Patent No.: US 8,988,040 B2
(45) Date of Patent: Mar. 24, 2015

(54) COMPACT CAR CHARGER

(75) Inventors: Gordon Levy, Golden, CO (US); Ming Shan, Thornton, CO (US); David L. Martin, Highlands Ranch, CO (US)

(73) Assignee: Navajo Manufacturing Company, Inc., Denver, CO (US)

( * ) Notice: Subject to any disclaimer, the term of this patent is extended or adjusted under 35 U.S.C. 154(b) by 363 days.

(21) Appl. No.: 13/490,899

(22) Filed: Jun. 7, 2012

(65) Prior Publication Data
US 2013/0328526 A1 Dec. 12, 2013

(51) Int. Cl.
H02J 7/00 (2006.01)
H01R 13/66 (2006.01)
H01R 13/68 (2011.01)
H01R 24/00 (2011.01)

(52) U.S. Cl.
CPC ....... *H02J 7/0042* (2013.01); *H02J 2007/0062* (2013.01)
USPC ...... 320/107; 320/111; 320/114; 439/620.21; 439/620.31; 439/668

(58) Field of Classification Search
CPC ... Y02E 60/12; H02J 7/0042; H01R 13/6616; H01R 13/68; H01R 24/58
USPC ........ 320/107, 111, 114; 439/620.21, 620.31, 439/668
See application file for complete search history.

(56) References Cited

U.S. PATENT DOCUMENTS

| | | | |
|---|---|---|---|
| 4,701,741 A | 10/1987 | Bert | |
| D330,885 S | 11/1992 | Tattari | |
| D398,287 S | 9/1998 | Luminosu | |
| 5,831,515 A * | 11/1998 | Stewart et al. | 340/384.4 |
| 5,847,545 A * | 12/1998 | Chen et al. | 320/138 |
| 5,964,132 A * | 10/1999 | Chen | 81/439 |
| 6,215,276 B1 * | 4/2001 | Smith | 320/111 |
| 6,424,806 B1 * | 7/2002 | Ohmura et al. | 396/60 |
| 6,612,875 B1 * | 9/2003 | Liao | 439/675 |
| 6,641,405 B2 * | 11/2003 | Chou | 439/32 |
| 6,896,529 B2 * | 5/2005 | Jing | 439/135 |
| 6,956,353 B1 * | 10/2005 | Klitzner | 320/107 |
| D526,962 S | 8/2006 | Krieger | |
| 7,166,987 B2 * | 1/2007 | Lee et al. | 320/114 |
| D546,287 S | 7/2007 | Tanishita | |
| D551,170 S | 9/2007 | Hussaini | |
| 7,281,814 B2 * | 10/2007 | Sheen | 362/183 |
| D559,776 S | 1/2008 | Kim | |
| D563,873 S | 3/2008 | Chen | |
| D574,833 S | 8/2008 | Hussaini | |
| D585,825 S | 2/2009 | Ji | |
| 7,563,130 B2 * | 7/2009 | Farrar et al. | 439/501 |
| D617,278 S | 6/2010 | Tang | |
| D622,218 S | 8/2010 | Tseng | |
| 7,789,523 B2 * | 9/2010 | Arnold, III | 362/183 |
| D627,720 S | 11/2010 | DuMelle | |
| D636,725 S | 4/2011 | Levy | |
| D637,557 S | 5/2011 | Wegener | |
| D641,695 S | 7/2011 | Wegener | |
| 7,973,512 B2 * | 7/2011 | Sage et al. | 320/107 |
| 7,993,164 B2 * | 8/2011 | Chatterjee et al. | 439/628 |
| 8,058,840 B2 * | 11/2011 | Daniel et al. | 320/112 |

(Continued)

*Primary Examiner* — Stacy Whitmore (74) *Attorney, Agent, or Firm* — Studebaker & Brackett PC (57) ABSTRACT

A car charger plug is slidably mounted within a body of the compact car charger. The car charger plug is lockable in a fully retracted position and lockable in a fully extended position, so as to maintain its compact size when not in use, and provide a secure connection with a car charge port when desired.

20 Claims, 6 Drawing Sheets

(56) References Cited

U.S. PATENT DOCUMENTS

| | | | |
|---|---|---|---|
| 8,410,752 B2* | 4/2013 | Sulem et al. | 320/111 |
| 8,491,317 B2* | 7/2013 | Vardanyan | 439/131 |
| 8,512,054 B2* | 8/2013 | Lee et al. | 439/131 |
| 8,547,059 B2* | 10/2013 | Kurumizawa et al. | 320/111 |
| 8,574,056 B2* | 11/2013 | Malle et al. | 463/17 |
| 8,633,674 B2* | 1/2014 | Law | 320/110 |
| 8,638,064 B2* | 1/2014 | Sulem et al. | 320/111 |
| 8,641,435 B2* | 2/2014 | Bromell | 439/188 |
| 2011/0084660 A1* | 4/2011 | McSweyn | 320/111 |
| 2011/0254500 A1* | 10/2011 | Lee et al. | 320/107 |

\* cited by examiner

COMPACT CAR CHARGER

FIELD OF THE INVENTION

The present invention relates to the field of car chargers, and specifically to a car charger having a car charger plug retractable into and extendable out of a car charger body.

BACKGROUND OF THE INVENTION

Portable car chargers used for charging cellular devices, laptops, GPS devices and other portable electronics are known. Often times, these chargers include a pivoting car charger plug which extends from a base unit by rotation about a pivot point. Alternatively, the location of the pivot point is adjustable.

In all of these known devices, the size of the charger is considered bulky and cumbersome in use. Space for storage of these chargers is often limited and, therefore, there is a need to reduce the space occupied by such chargers.

SUMMARY OF THE INVENTION

Accordingly, there is a need to produce a compact car charger providing connection to a power outlet of an automobile, as well as provide the alternative use of AC power. Typically, a USB socket is provided for connecting a charging cord from an electronics device to the car charger.

By the present invention, a car charger plug is slidably mounted within a body of the compact car charger. The car charger plug is lockable in a fully retracted and lockable in a fully extended position, so as to maintain its compact size when not in use, and provide a secure connection with a car charge port when desired.

This object is accomplished by a slidable car charger plug maintained in position by a biased slide switch. The slide switch is held in a locked position with the car charger plug housed substantially within the body of the car charger. Upon depression of the slide switch against the bias of a spring recessed within a blind hole of the car charger plug, the slide switch is allowed to move along a slide track within the car charger body. Upon reaching the terminal distal end of the slide track, the slide switch is biased into a locked position with full extension and locking of the car charger plug. The car charger plug is thereby ready for engagement with a car charge port.

The compact car charger of the present invention also includes a pair of AC plug connector prongs for connection to an electrical outlet. A charging cord for an electrical device is connected to the car charger by a USB connection. The electrical device can also alternately be charged by way of an AC power source.

It is therefore another object of the present invention to provide a compact car charger having a slidable car charger plug which is extendable from a fully recessed position to a fully extended position projecting out of the car charger body.

It is another object of the present invention to provide a compact car charger having a slidable car charger plug which is extendable from a fully recessed position to a fully extended position projecting out of the car charger body with the car charger plug being locked in position in the fully recessed position and in the fully extended position.

It is still yet another object of the present invention to provide a compact car charger having a slidable car charger plug which is extendable from a fully recessed position to a fully extended position projecting out of the car charger body with the car charger plug being locked in position in the fully recessed position and in the fully extended position with the car charger body also including a pair of AC connector prongs and a USB port.

These and other objects of the invention, as well as many of the intended advantages thereof, will become more readily apparent when reference is made to the following description taken in conjunction with the accompanying drawings.

BRIEF DESCRIPTION OF THE DRAWINGS

The following drawings illustrate examples of various components of the invention disclosed herein, and are for illustrative purposes only. Other embodiments that are substantially similar can use other components that have a different appearance.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to the drawings, in general, and to FIGS. 1 through 5, in particular, a compact car charger embodying the teachings of the subject invention is generally designated as 10. With reference to its orientation in FIG. 1, the compact car charger includes a body or housing 12. A car charger plug 14 is shown projecting slightly from distal end 16 of the body 12. The car charger plug is locked in the "retracted position".

Figure 2:
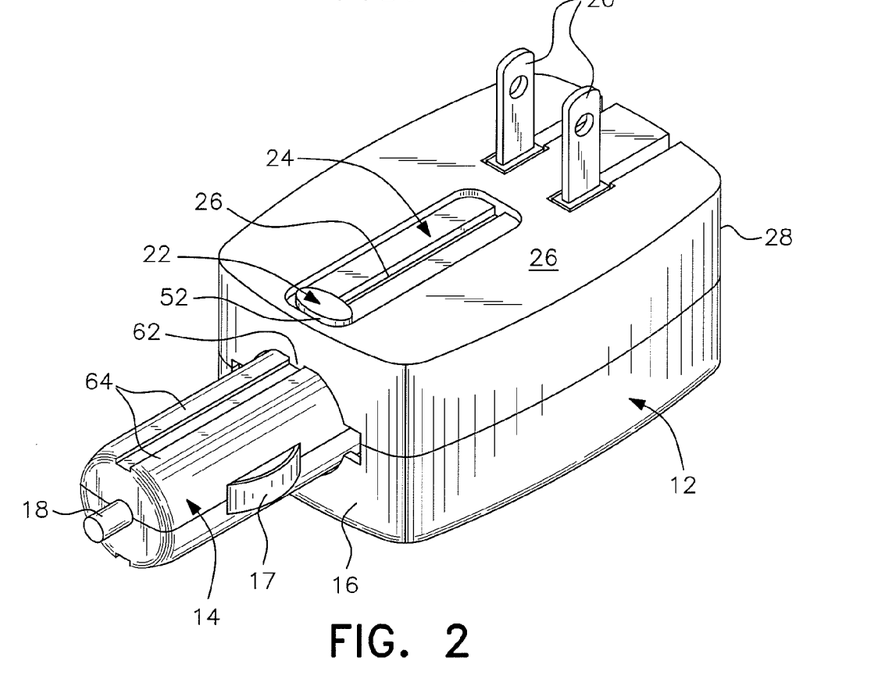
FIG. 2 is a bottom perspective view of the car charger with the car charger plug locked in the fully extended position and a pair of AC prongs extended as would be done when the car charger is connected to an AC electrical source.
Figure 3:
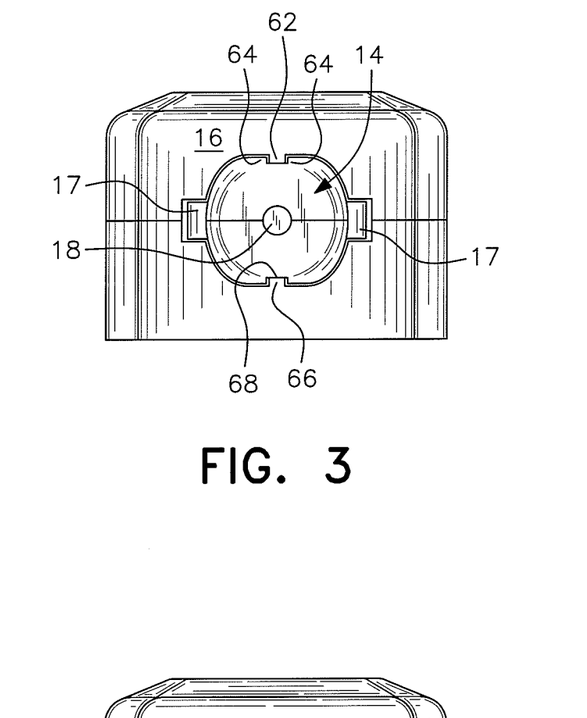
FIG. 3 is an end view of the car charger body.

As shown in FIG. 2, the car charger plug 14 is shown in the locked "fully extended position". In this view, car charge port electrical contacts 17, 18 are shown. In this view, two AC electrical prongs 20 are shown in an extended position. These prongs 20 are pivotable between the extended position shown in FIG. 2 and the recessed position shown in FIGS. 4 and 5. The AC prongs are used for charging a portable electronics device by insertion into an AC outlet or a car charger inverter.

Also shown in FIG. 2 is a slide switch 22 which travels along a recessed path 24 in the bottom 26 of the body 12. A slide track 26 extends centrally through the recessed path 24 and extends through the body 12 into the interior of the body. At the position shown in FIG. 2, the slide switch 22 is locked at the distal end 16 of the charger. By sliding of switch 22 towards the proximal end 28 of the body 12, the car charger plug will be withdrawn into the interior of the body 12 as shown in FIG. 5.

Figure 4:
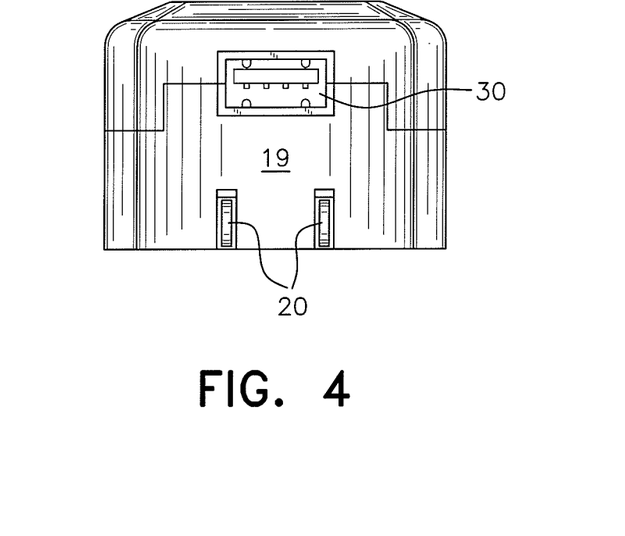
FIG. 4 is an opposite end view of the car charger body.

As shown in FIG. 4, at the proximal end 19 of the body 12 is located a USB port 30. A charging cord (not shown) is connected to the USB port 30 at one end and its opposite end is connected to an electronics device for charging purposes.

Figure 1:
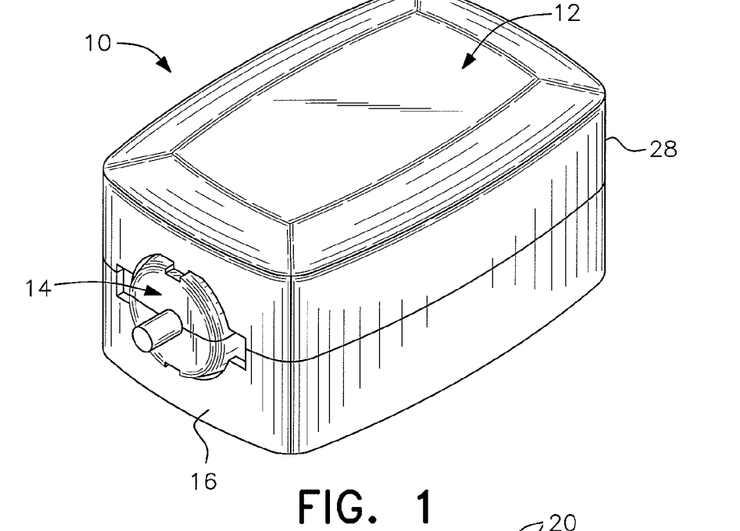
FIG. 1 is a top perspective view of the compact car charger according to the principles of the present invention.
Figure 5:
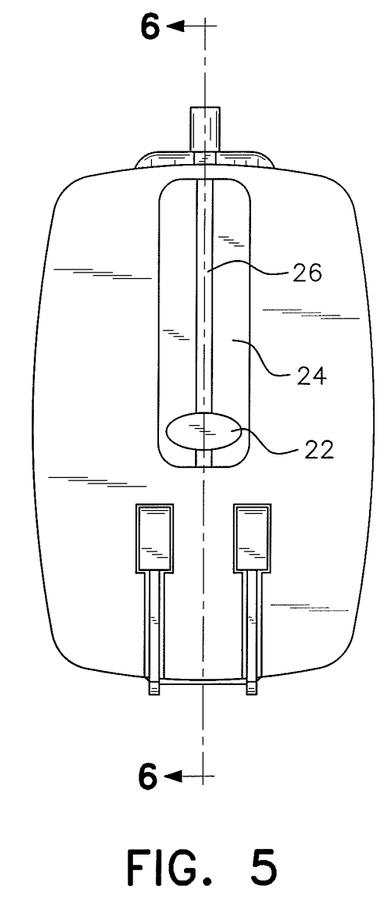
FIG. 5 is a bottom view of the car charger body with the car charger plug locked in a retracted position within the car charger body and the AC prongs recessed into the bottom surface of the car charger body.
Figure 6:
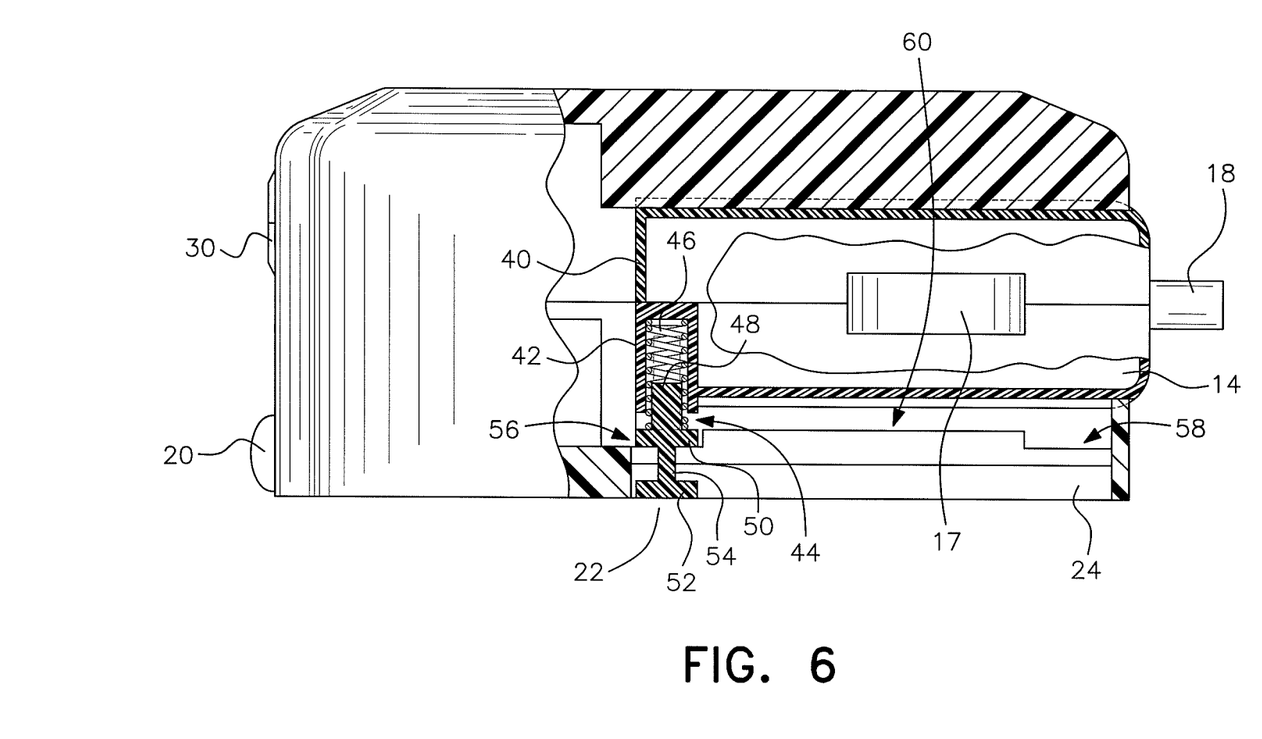
FIG. 6 is a partial sectional view taken along line 6-6 of FIG. 5 illustrating the car charger plug locked in the fully retracted position.
Figure 7:
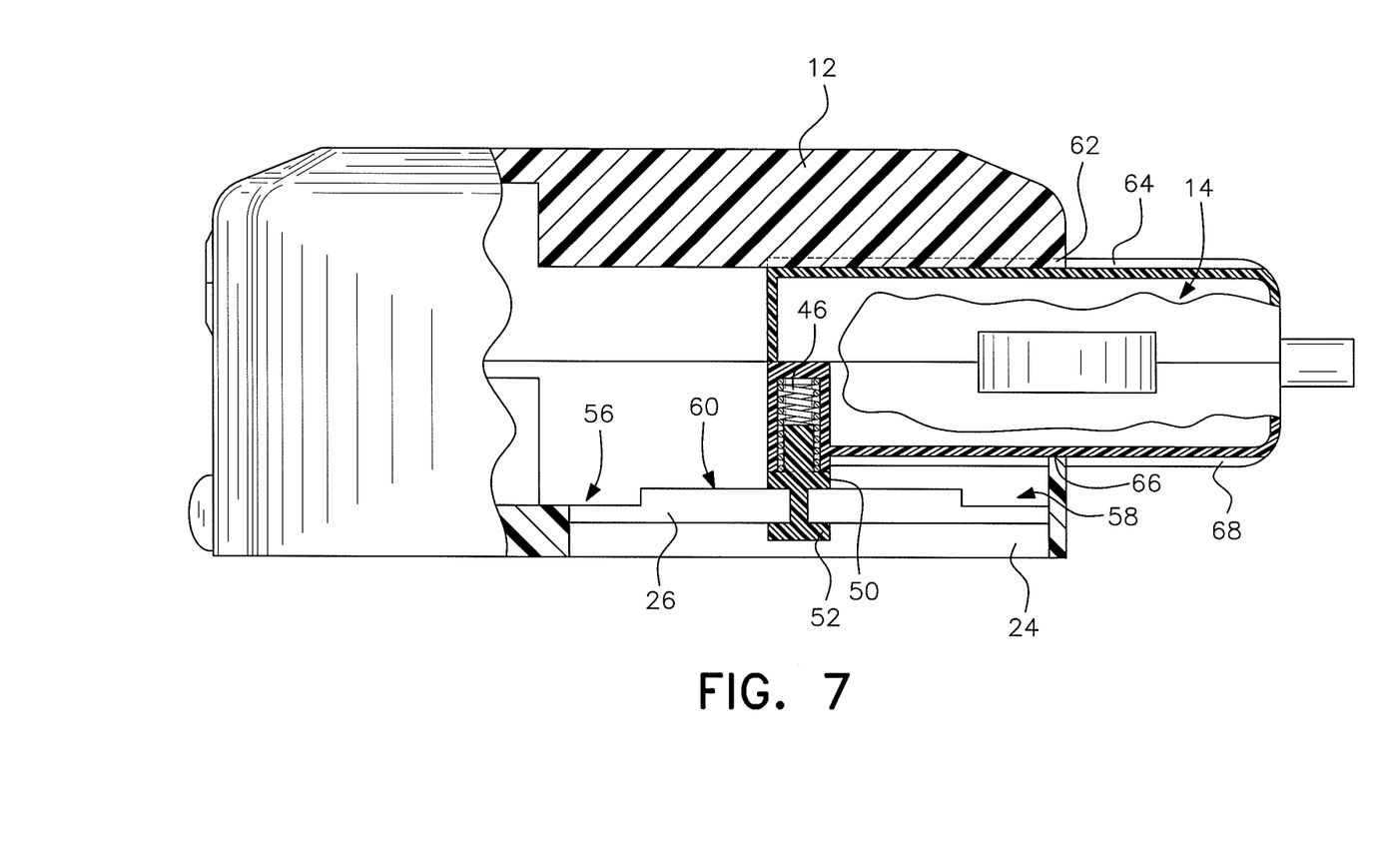
FIG. 7 is a partial cross-sectional view illustrating the transitional positioning of the car charger plug between the locked fully retracted position and the locked fully extended position.
Figure 8:
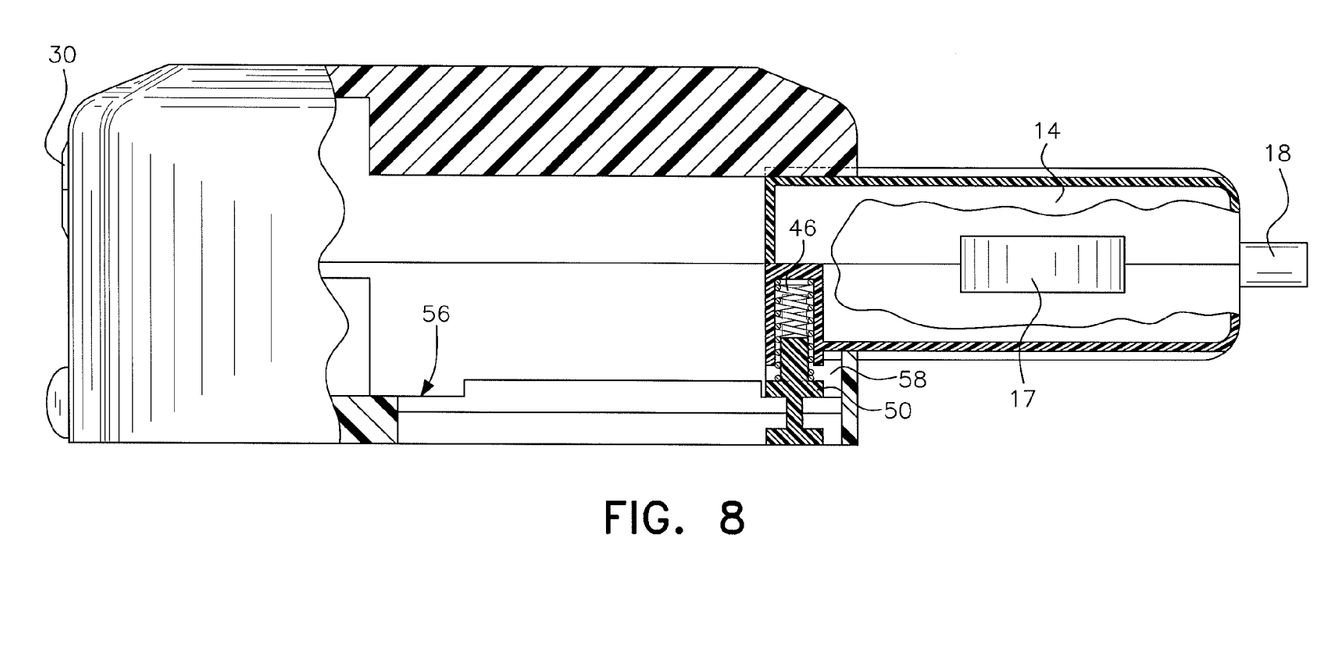
FIG. 8 is a partial cross-sectional view showing the car charger plug locked in the fully extended position.

To explain the transitional movement of the car charger plug from the fully retracted position as shown in FIGS. 1 and 5 to the fully extended position shown in FIG. 2, reference is made to partial cross-sectional FIGS. 6 through 8.

In FIG. 6, the car charger plug 14 is schematically shown as having a hollow body. At the proximal end 40 of the plug is located a cylindrical hole 42 open at end 44 and containing a spring 46. Spring 46 is biased out of the hole 42 towards the open end 44. The spring surrounds a portion 48 of slide switch 22 which projects into the interior of the charger plug. The projecting end of the spring 46 surrounds projection 48 and engages flat plate portion 50 of slide switch 22. Plate portion 50 is connected to plate portion 52 of switch 22 which is seen from the exterior of the body 12 as shown in FIG. 2, for example. Interconnecting plate portions 50 and 52 is a rectangular-shaped connecting portion 54 which slides within slide track 26.

A guide path is defined on the interior of the body 12 by two recessed portions 56 and 58 located on opposite sides of a projecting portion 60. In FIG. 6, the plate portion 50 is resting in recessed portion 56 due to the bias of spring 46 pressing plate portion 50 below the height of raised portion 60 on opposite sides of the glide path. By pushing on plate portion 52 of the slide switch against the bias of spring 46, the plate portion 50 clears the height of raised portion 60. Upon continued pressure on plate portion 52, and movement of plate portion 52 towards the distal end 16 of the body 12, the car charger plug 14 is slid out of the body 12 as shown in FIG. 7.

On an opposite side of the car charger plug 14 from that of the slide switch is located a projecting rib 62 of the body 12 which rides between elevated portions 64 of the car charger plug to provide stability in sliding movement of the plug 14 into and out of the body 12. Similarly, on the opposite side of the plug 14, the body 12 forms a rib 66 for traveling within a groove 68 of the plug 14 for guiding the plug into and out of the body 12.

As shown in FIG. 7, as the plug 14 is being slid into or out of the body 12, and the spring 46 is compressed within hole 42 while the plate portion 50 rides along the top of raised portions 60 in the glide path. Meanwhile, plate portion 52 is recessed within recessed path 24 as the slide switch is moved along the slide track 26.

Upon reaching the fully extended position of the car charger plug as shown in FIG. 8, the bias of spring 46 pushes plate portion 50 into recessed portion 58 to lock the position of the car charger plug 14 in the fully extended position. In this position, due to the stabilized locking of the car charger plug in the fully extended position, the electrical contacts 16 and 17 can be pushed into engagement with the electrical connections of a car charge port so as to provide power to the USB port 30 for connection with an electrical charging cable. For illustrative purposes, the electrical connection between the electrical contacts of the car charger plug 14 and the USB port 30 have not been shown.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

We claim:

1. A car charger comprising
a body, and
a car charger plug have side mounted electrical contacts,
said car charger plug being slidably mounted between two terminal positions, a first terminal position of the two terminal positions locating the car charger plug and the electrical contacts inside said body in a fully retracted locked position and a second terminal position of the two terminal positions locating the car charging plug and the electrical contacts located out of the body in a fully extended locked position,
the car charger plug and the electrical contacts being freely slidable between the two terminal positions until reaching the fully extended locked position where the electrical contacts are completely exposed and accessible for use or the fully retracted locked position where the electrical contacts are entirely contained in the body and inaccessible for use.

2. The car charger according to claim 1, wherein a slide switch moves the car charger plug between the extended locked position and the retracted locked position.

3. The car charger according to claim 2, wherein the slide switch moves along a slide path recessed in an exterior of said body.

4. The car charger according to claim 3, wherein the slide path includes a slide track, said slide switch extends through said slide track into an interior of said body.

5. The car charger according to claim 2, wherein said slide switch is biased away from said body by a spring located inside said body.

6. The car charger according to claim 5, wherein said slide switch includes an exterior plate portion located on an exterior of said body, said exterior plate portion being connected to an interior plate portion located in an interior of said body, said spring engages said interior plate portion.

7. The car charger according to claim 6, wherein said interior plate portion slides along the interior of said body between two spaced recessed portions interconnected by a raised portion.

8. The car charger according to claim 7, wherein said two spaced recessed portions lock said car charger plug in the extended position and the retracted position by positioning of said interior plate portion in said spaced recessed portions.

9. The car charger according to claim 1, wherein said body includes a USB port.

10. The car charger according to claim 9, wherein said body includes pivotable AC plug prongs.

11. A ear charger comprising
a body having an opening at one end, and
a car charger plug having side mounted electrical contacts,
the car charger plug being slidably mounted between two terminal positions, a first terminal position of the two terminal positions locating the car charger plug and the electrical contacts inside said body to move into said body through said opening in a fully retracted locked position and a second terminal position of the two terminal positions locating the car charging plug and the electrical contacts moved out of the body through said opening in a fully extended locked position,
the car charger and contacts being freely slidable between the two terminal positions until reaching the fully extended locked position where the electrical contacts are completely exposed and accessible for use or the fully retracted locked position where the electrical contacts are entirely contained in the body and inaccessible for use.

12. The car charger according to claim 11, wherein said car charger plug has exterior surfaces shaped complementary to said opening in said body to stabilize sliding of the car charger plug into and out of said body and said opening in said body includes recesses to accommodate the passage therethrough of the electrical contacts.

13. The car charger according to claim 12, wherein said car charger plug and said body include complementary ribs and grooves interfitting with each other.

14. The car charger according to claim 11, wherein a slide switch moves the car charger plug between the extended locked position and the retracted locked position.

15. The car charger according to claim 12, wherein the slide switch moves along a slide path recessed in an exterior of said body.

16. The car charger according to claim 13, wherein the slide path includes a slide track, said slide switch extends through said slide track into an interior of said body.

17. The car charger according to claim 14, wherein said slide switch is biased away from said body by a spring located inside said body.

18. The car charger according to claim 17, wherein said slide switch includes an exterior plate portion located on an exterior of said body, said exterior plate portion being connected to an interior plate portion located in an interior of said body, said spring engages said interior plate portion.

19. The car charger according to claim 18, wherein said interior plate portion slides along the interior of said body between two spaced recessed portions interconnected by a raised portion.

20. The car charger according to claim 19, wherein said two spaced recessed portions lock said car charger plug in the extended position and the retracted position by positioning of said interior plate portion in said spaced recessed portions.

* * * * *